Patented Oct. 6, 1953

2,654,732

UNITED STATES PATENT OFFICE 2,654,732

LUMINESCENT RESINS FROM ARYL-SUB-STITUTED ALKYL HALIDES AND ALKENYL ETHERS OF A POLYHYDROXY ORGANIC COMPOUND

Edward M. Geiser, Downers Grove, Ill., assignor to Universal Oil Products Company, Chicago, Ill., a corporation of Delaware No Drawing. Application November 23, 1951, Serial No. 257,955

19 Claims. (Cl. 260—91.1)

This invention relates to a condensation process involving the reaction of aryl-substituted alkyl halides and certain unsaturated ethers of hydroxy organic compounds and further relates to the resinous materials prepared thereby. More specifically, the invention concerns a process and the product thereof, said process comprising the condensation reaction of an aryl-substituted alkyl halide with an alkenyl ether of a polyhydroxy organic compound, wherein said alkyl group and said alkenyl group contains more than one, up to about five carbon atoms per group, the condensation reaction is effected in the presence of an aqueous alkaline medium, and results in the formation of fluorescent, generally resinous products, some of the liquid resinous products of which are capable of undergoing conversion to tough, adherent films upon exposure to atmospheric oxygen.

In one of its embodiments, the present invention relates to a process for the production of a fluorescent resinous material which comprises reacting an aryl-substituted alkyl halide with an alkenyl ether of a polyhydroxy organic compound in the presence of an aqueous alkaline medium at condensation reaction conditions.

A more specific embodiment of the invention concerns a process for the condensation of an $\alpha,\alpha'$-dichloroxylene with a glycerol-$\alpha$-allyl ether at a temperature of from about 35° to about 200° C. in the presence of an aqueous alkali metal hydroxide and an inert solvent for said dichloroxylene and said glycerol ether.

The reaction involved in the process of this invention which yields novel compositions of matter characterized as resinous materials having fluorescent properties and which are capable of existing in the form of viscous, oily liquids having air-drying properties, is essentially a condensation or metathesis type of reaction. It is believed that the fluorescent resinous product is formed as a result of the substitution of at least one aralkyl group of the aryl-substituted alkyl halide reactant on one of the double bonded carbon atoms of at least one of the alkenyl groups present in the structure of the polyhydroxy ether reactant, the substitution occurring via condensation with the accompanying elimination of hydrogen halide from the reaction mixture. The reactants involved in the condensation may be selected so as to introduce multiple aralkyl groups into the structure of the polyalkyloxy ether, the number of such substituents capable of being introduced into the ether via the condensation reaction being limited only by the effect of spatial interference of the condensing groups.

The reactant herein referred to as an aralkyl halide is a compound having the general structure corresponding to the following empirical formula: $Z_m$—$Ar(RX)_n$, wherein Ar is an aromatic hydrocarbon radical such as a mono- or polyvalent benzene, phenylbenzene-, naphthalene-, anthracene-, or phenanthrene-derived radical. Z represents a non-interfering substituent group on the aryl nucleus such as alkyl, cycloalkyl, nitro, halogen, carboxyl, hydroxyl etc., R is a halogen-substituted alkyl group containing from 1 to 5 carbon atoms per group, X is a halogen, preferably chlorine and/or bromine, $n$ is a numeral selected from 1 to 3, preferably 1 and 2, and $m$ is a numeral selected from 0 to 2. The combination: RX represents an alkyl halide substituted on the aryl nucleus Ar. Typical representative reactants of the above general class of aralkyl halides utilizable in the condensation reaction are such compounds as benzylchloride, benzylbromide, the various mono-, and dimethyl halide analogs of toluene and xylene, such as the ortho-, meta-, and para-dichloroxylenes, the ortho-, meta, and para-$\alpha,\alpha'$-dichloroxylenes, the ortho-, meta-, and para-$\alpha,\alpha'$-dichloroxylenes (i. e., the tolylmethylene dichlorides), the 1,1-dichloro- (ortho-, meta-, and para-chloro)-3-phenylpropanes, 1,1-dichloro-4-tolybutane, 1-chloro-3-(ortho-chlorophenyl)-propane, 1-chloro-3-(ortho-, meta-dichlorophenyl)-propane, 1-chloro-2-(ortho-nitrophenyl)-ethane, 3-chloro-(4-hydroxynaphthyl)-butane, and others of the general structure indicated above and containing up to about five carbon atoms per alkyl halide group. In general, it is preferred that the halogen radical involved in the condensation with the alkenyl ether reactant in the present process be substituted at the end of the alkylene chain further from its point of attachment to the aryl nucleus, although compounds containing other position substitutions of the halogen radical on the alkylene chain may also be utilized as reactants in the condensation process, but not necessarily with equivalent results.

The reactant referred to herein as an alkenyl ether of a polyhydroxy organic compound may be a mono- or a polyalkenyl ether of one or more of the multiple hydroxy groups of a polyhydroxy organic compound. This class of reactants may be represented as a group by the empirical formula: $(RO)_m$—$Z(OH)_n$, wherein Z is selected from the mono- or polyvalent alkylene, cycloalkylene, arylene and aralkylene radicals, R is an alkenylene group (that is, an unsaturated alkyl radical) containing from 2 to about 5 carbon atoms per group and $m$ and $n$ are small whole numbers which together have a total sum of from 1 to 6, provided, further that $m$ is at least 1, although $n$ may be zero. Typical representative compounds utilizable as the ether reactant herein include such compounds as the mono- and polyalkenylene ethers of such classes of poly- and polyalkenylene ethers of such classes of polyhydroxy organic compounds as the polyhydric alcohols and polyhydroxy phenols including alicyclic as well as cyclic alcohols such as ethanediol (ethylene glycol), glycerol, the 1,2- and 1,3-propanediols, the 1,2-, 1,3-, 1,4-, and 2,3-butanediols, the 1,2,3- and 1,2,4-butanetriols, the polyhydroxy-substituted naphthenes, such as inositol and quercitol, the hydroxy-phenols such as hydroquinone, resorcinol, pyrocatechol, pyrogallol, phloroglucinol, etc. and the hydroxynaphthols, such as 1,3-dihydroxynaphthalene and others. The alkenyl groups which form the ethers of the above polyhydroxy organic compounds are such typical groups as vinyl, allyl, butenyl, and pentenyl which may occur more than once in the structure of the ether; that is, the ethers may contain one or more alkenoxy groups, generally not more than about three of such groups. The preferred ethers are the relatively simple mono- and dialkenyl ethers containing 2 to 3 carbon atoms per alkenyl group, that is, the vinyl and allyl ethers, which are preferred because of the relatively greater reactivity of these compounds in the resin-forming reaction involved in the present process and, further, because these represent the least expensive of the series of utilizable reactants and may be prepared more easily from readily available starting materials, particularly when diols and triols of the aliphatic naphthenic, and aromatic series are employed in the etherification reaction involved in the preparation of the corresponding alkenyl ethers thereof. Such compounds as the mono- and divinyl ethers and the mono- and diallyl ethers of ethanediol and glycerol are particularly preferred, although the invention is not intended to be limited thereto. Some of the above reactants produce resinous products of greater fluorescence and greater drying capacity than others included in the series of compounds mentioned above; the various alkenyl ethers and aryl-substituted alkyl halides, therefore, are not necessarily equivalent in their capacity to yield products having resinous and drying qualities, and particularly fluorescent resins.

The ethers are ordinarily prepared by reacting the polyhydroxy organic compound with an alkenyl halide in the presence of a strong aqueous alkaline solution such as an aqueous solution of sodium or potassium hydroxide. The strength of the caustic condensing agent required to obtain the etherification and the temperature at which the reaction is effected is dependent upon the reactivity of the alkenyl halide, and in addition, upon the number of alkenyl ether groups to be introduced into the alkenyl ether reactant. Thus, vinyl halides for this reason, generally require alkaline solutions of the greater pH value and the temperature and pressure conditions required for effecting the etherification are generally more severe than the homologs of the vinyl halides.

The condensation or resin-forming reaction of the alkenyloxy ether and the aryl-substituted alkyl halide is effected at a temperature of from about 35° to about 200° C. and at a pressure sufficient to maintain the reactants in a substantially liquid phase, which in the case of the relatively volatile reactants and for those reactants requiring more severe temperature conditions in order to accomplish the condensation, is generally superatmospheric up to about 100 atmospheres. The molecular ratio of reactants charged into the condensation reaction is determined by the number of reactive groups in the aralkyl halide and alkenoxy reactants. Since the formation of the product is believed to be the result of the condensation between the halogen of the aralkyl halide reactant with one of the double bonded carbon atoms of the alkenoxy group of the ether reactant the case of condensation, in general, depends upon the number of alkenoxy groups compared with the number of alkylene halide groups present in the reaction mixture. The proportion of reactants is, therefore, equimolecular when the ratio of said groups is 1 to 1, although an excess of the generally less expensive aralkyl halide reactant may be utilized to promote the condensation reaction. The quantity of aqueous alkaline material present in the reaction mixture is at least sufficient to react with the hydrogen halide resulting from the condensation of the halide and alkylene ether reactants. Preferably, the quantity of aqueous alkaline condensing agent is greater than the above minimum requirement, generally from 2 to about 10 moles of the caustic per mole of hydrogen halide liberated in the condensation reaction. Suitable alkaline materials for this purpose are the alkali metal hydroxides, such as lithium, sodium, and potassium hydroxide, sodium methylate and sodium ethylate, the alkaline earth metal hydroxides such as calcium and magnesium hydroxide, the alkali metal cyanides, the strongly alkaline amines such as the di- and trialkylamines, particularly trimethylamine, triethylamine, etc. In the case of the aqueous alkali metal caustic solutions, generally the most useful condensing agent which may be utilized in the process, the aqueous caustic solution preferably contains at least 20% by weight of alkali metal hydroxide and may contain up to about 40% of the base.

In the preferred method of effecting the condensation reaction, the reactants and aqueous alkali material are reacted at the above temperature and pressure conditions in the presence of a solvent for either the alkenyl ether or the aralkyl halide, or more desirably for both reactants. The solvent is selected from organic liquids which are inert in the presence of the reactants and the aqueous alkaline material and further desirably have boiling points sufficiently high to remain in liquid phase at the particular condensation reaction conditions. Of the organic solvents having the above properties, the class of solvents characterized as aliphatic, naphthenic, and aromatic hydrocarbons are the most useful, and of these, the aromatic hydrocarbons of the benzene series are preferred. Typical solvents of the aromatic hydrocarbon series are such compounds as benzene, toluene, xylene, ethylbenzene and high homologs thereof. When the reaction conditions required to effect the desired condensation are such that relatively high temperatures must be utilized to obtain the condensation, that is, at temperatures in the upper regions of the range: 35° to 200° C., polycyclic aromatic hydrocarbons such as naphthalene, alkylnaphthalenes, anthracene etc. may be employed. The solvent may be recovered from the reaction mixture following completion of the condensation reaction and recycled, if desired, to a subsequent condensation reaction.

The process may be effected in any suitable equipment appropriate for obtaining an intimate dispersion of the reactants with the condensing agent and/or solvent, preferably in a pressure autoclave equipped with a suitable stirring device and means for heating the reaction mixture at the desired condensation reaction temperature.

Following completion of the reaction, the solvent is removed from the reaction mixture by any suitable means such as evaporation, extraction, decantation, etc. The residue remaining after removal of the solvent is desirably washed with water to remove excess alkaline condensing agent and undesired by-products of the reaction. If any unconverted reactant remains in the resulting residue, these may be recovered by solvent extraction, distillation or other means appropriate for the particular reactant. The residue which remains after removal of the above components present in the reaction mixture constitutes the resinous condensation product which may exist as a solid or as a viscous liquid, depending upon the choice of reactants utilized in the condensation reaction.

The present product, generally characterized as a resinous material, possesses the unique property of fluorescing when placed in a beam of light. The resinous products vary in color from pale yellow to various shades of red depending upon the choice of reactants and the liquid products generally possess air-drying properties when exposed as thin film to atmospheric oxygen; that is, the liquids are essentially drying oil resins and may be incorporated into coating compositions, particularly for such uses in which the fluorescent property of the resin may be advantageously applied. Thus, the resin may be mixed with other drying oils of either the unsaturated hydrocarbon type or the unsaturated fatty acid glyceride type to produce varnishes or admixed with other drying oils, dryers, etc. to form paints, drying inks, etc. In the case of a coating composition prepared from the present resin either alone or in a mixture with other drying oils, the dried film is a clear, lightly colored, tough, coating which transmits light therethrough and emits the radiation from an edge of the film or from various points on the surface of the film.

The invention is further illustrated and described in the following examples, which, however, are not intended to limit the scope of the invention to the specific disclosures therein.

*Example I*

A mixture of 1, x-bis-chloromethylbenzenes, comprising a mixture of 1,2-isomer, 1,3-isomer and 1,4-isomers, prepared by reacting benzyl-chloride with paraformaldehyde in the presence of anhydrous zinc chloride and through which a stream of hydrogen chloride is passed while the reaction mixture is thoroughly stirred, is utilized as the aryl-substituted alkyl halide reactant in the preparation of a fluorescent resinous material. 17 grams of the above dichloroxylene mixed isomers and 18.6 grams of glycerol-alpha-allyl ether are dissolved in 100 cc. of toluene and the resulting solution mixed with 44 grams of sodium hydroxide dissolved in 200 cc. of water at a temperature of 107° C. (the reflux temperature of the mixture), accompanied by vigorous stirring for five hours. The reaction mixture is thereafter washed with water, extracted with dimethyl ether and distilled at 1 mm. mercury pressure after removal of the ether extractant and dichloroxylene at atmospheric pressure. 26 grams of a yellow, luminescent, oily material is recovered as bottoms from the distillation. The oil when spread as a thin film on the surface of a glass panel dries to a tack-free, hard and tough resinous film in 1.5 days. When a beam of light is directed to the edge of the glass panel, the resinous air-dried surface glows by fluorescence.

*Example II*

13 grams of 1-chloro-2-phenylethane is mixed with 10.5 grams of the monovinyl ether of 1,3-propane glycol in the presence of 50 cc. of an aqueous 30% sodium hydroxide solution at a temperature of 110° C. in a pressure autoclave for a reaction period of four hours. The resulting reaction mixture is mixed with ten volumes of water and three volumes of dimethyl ether and the resulting mixture allowed to settle into a two-phase system. The ether solution is decanted from the aqueous layer and subjected to distillation to recover the ether solvent and unreacted phenylchloroethane. 18 grams of a soft resinous, yellow-colored, residue which possesses fluorescent properties is recovered as the residue.

*Example III*

An oily liquid having drying and fluorescent properties is prepared by the condensation of 17 grams of 1-chloro-4-phenylbutane and 15 grams of the mono-allyl ether of benzyl alcohol. The reactants are mixed with 50 cc. of a 30% aqueous solution of sodium hydroxide in a rotating pressure autoclave at a temperature of 150° C. for 5 hours to obtain the desired condensation reaction. The oily liquid product is recovered as the product in Example II above, the residue from the distillation when spread as a thin film on the surface of a glass panel undergoes air-drying to form a tough, tack-free film having fluorescent properties.

I claim as my invention:

1. A process for the production of a fluoroscent resinous material which comprises reacting an aryl-substituted alkyl halide with an alkenyl ether of a polyhydroxy organic compound in the presence of an aqueous alkaline medium at condensation reaction conditions.

2. The process of claim 1 further characterized in that said condensation reaction is effected at a temperature of from about 35° to about 200° C. and at a pressure sufficient to maintain the reactants in substantially liquid phase.

3. The process of claim 1 further characterized in that said aryl alkyl halide and alkenyl ether are reacted in the presence of an inert solvent for at least one of said reactants.

4. The process of claim 1 further characterized in that the alkyl group of said aryl-substituted alkyl halide contains about 1 to 5 carbon atoms per group.

5. The process of claim 4 further characterized in that said aryl-substituted alkyl halide is an $\alpha,\alpha'$-dihaloxylene.

6. The process of claim 5 further characterized in that said aryl-substituted alkyl halide is $\alpha,\alpha'$-dichloroxylene.

7. The process of claim 4 further characterized in that said aryl-substituted alkyl halide is benzyl-chloride.

8. The process of claim 1 further characterized in that said alkenyl ether of a polyhydroxic organic compound is an alkenyl ether of a polyhydroxy aliphatic alcohol.

9. The process of claim 8 further characterized in that the alkenyl group of said alkenyl ether is vinyl.

10. The process of claim 8 further characterized in that said polyhydroxy aliphatic alcohol is glycerol.

11. The process of claim 1 further characterized in that the alkenyl group of said alkenyl ether contains from 2 to 5 carbon atoms per alkenyl group.

12. The process of claim 11 further characterized in that said alkenyl group is vinyl.

13. The process of claim 11 further characterized in that said alkenyl group is allyl.

14. The process of claim 11 further characterized in that said alkenyl ether of a polyhydroxy organic compound is the monoalkenyl ether thereof.

15. The process of claim 1 further characterized in that said aqueous alkaline medium is an aqueous alkali metal hydroxide.

16. The process of claim 3 further characterized in that said inert solvent is an aromatic hydrocarbon.

17. The resinous product formed by the process of claim 1.

18. A process for the production of a resinous product which comprises reacting $\alpha,\alpha'$-dichloroxylene with glycerol-alpha-allyl ether at a temperature of from about 35° to about 200° C. in the presence of an aqueous alkali metal hydroxide and toluene.

19. The resinous product formed by the process of claim 18.

EDWARD M. GEISER.

References Cited in the file of this patent

UNITED STATES PATENTS

| Number | Name | Date |
| --- | --- | --- |
| 2,518,321 | Hoover | Aug. 8, 1950 |
| 2,522,501 | Brooks et al. | Sept. 19, 1950 |